United States Patent
Kaplan et al.

(10) Patent No.: US 6,191,195 B1
(45) Date of Patent: Feb. 20, 2001

(54) HEAT-CURABLE COATING MATERIALS

(75) Inventors: Andreas Kaplan, Chur; Manfred Wenzler, Domat/Ems; Juerg Heinz, Chur, all of (CH)

(73) Assignee: Ems-Inventa AG (CH)

( * ) Notice: Under 35 U.S.C. 154(b), the term of this patent shall be extended for 0 days.

(21) Appl. No.: 09/247,345

(22) Filed: Feb. 10, 1999

(30) Foreign Application Priority Data

Feb. 16, 1998 (DE) .................................. 198 06 284

(51) Int. Cl.⁷ .................................. C08K 5/13; C08L 63/02
(52) U.S. Cl. .................................. 523/456; 525/438
(58) Field of Search .................................. 525/438; 523/456

(56) References Cited

U.S. PATENT DOCUMENTS

| | | | | |
|---|---|---|---|---|
| 4,130,601 | * | 12/1978 | Ohoka et al. | 528/307 |
| 5,847,057 | * | 12/1998 | Kaplan et al. | 525/437 |

FOREIGN PATENT DOCUMENTS 197 40 206   5/1998   (DE) .

* cited by examiner

*Primary Examiner*—Robert Dawson
*Assistant Examiner*—D. Aylward
(74) *Attorney, Agent, or Firm*—Marshall & Melhorn

(57) ABSTRACT

The invention relates to a heat-curing coating material consisting of a carboxyl-functional polyester, and an epoxy resin and also at least one additional stabilizer.

7 Claims, No Drawings

HEAT-CURABLE COATING MATERIALS

BACKGROUND OF THE INVENTION

1. Field of the Invention

The present invention relates to heat-curable coating compositions, also called powder coating materials, consisting of a carboxyl-functional polyester, and an epoxy resin and a special stabilizer.

2. Description of the Prior Art

Powder coating materials whose binders comprise carboxyl-functional polyesters and epoxy resins based on bisphenol A and epichlorohydrin, so-called hybrid powder coating materials, have already been known for a relatively long time; see e.g. T. A. Misev: Powder Coatings (Chemistry and Technology), 1991 and David A. Bates: The Sciences of Powder Coatings, 1990.

Powder coating materials based on carboxyl-functional polyesters and epoxy resins based on bisphenol A and epichlorohydrin possess outstanding mechanical properties but only little weathering stability and are therefore unsuitable for use in the exterior sector.

A disadvantage of powder coating materials whose binders comprise carboxyl-functional polyesters and epoxy resins based on bisphenol A and epichlorohydrin is, furthermore, the low yellowing resistance in directly gas- and/or oil-heated ovens in comparison to electrically heated ovens. In directly gas- and oil-heated ovens the coated parts are in direct contact with the combustion gases of the gas- and/or oil-heated burners during the curing operation. In powder coating materials whose binders comprise carboxyl-function polyesters and epoxy resins based on bisphenol A and epichlorohydrin this leads to relatively severe yellowing of the cured powder coating film in comparison to powder coating films cured in electrically heated ovens.

SUMMARY OF THE INVENTION

The aim of the present invention is to eliminate this disadvantage of the lower stability of powder coating materials whose binders comprise carboxyl-functional polyesters and epoxy resins based on bisphenol A and epichlorohydrin in directly gas- and/or oil-heated ovens and to propose a corresponding powder coating material and a process for its preparation.

This object is achieved by the features of claim 1 in respect of a powder coating material and by the features of claim 5 in respect of the process. The subclaims indicate advantageous developments.

It has surprisingly been found that by the addition of compounds of the formula (I)–(X) this disadvantage of the lower yellowing stability in directly gas- and/or oil-heated ovens can be eliminated.

DESCRIPTION OF THE PREFERRED EMBODIMENTS

In accordance with the invention, the compounds of the general formula I–X are employed for this purpose. The coating material consists accordingly of: (A) a carboxyl-functional polyester prepared by a condensation reaction of aliphatic and/or cycloaliphatic polyols with aliphatic and/or cycloaliphatic and/or aromatic polycarboxylic acid and anhydrides, where the polyester has a Tg in the range from 30° C. to 80° C. and an acid number of from about 20 to 100 [mg of KOH/g]; (B) an epoxy resin based on bisphenol A and epichlorohydrin, where the equivalents ratio of epoxy equivalents to carboxylic acid equivalents lies within the range from 0.6 to 1.2; and (C) a compound of the formulae (I)–(X)

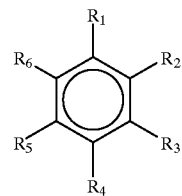

Formula I + II

I: with $R_1$=OH, $R_2$=$OR_7$, $R_3$, $R_4$, $R_5$, $R_6$, $R_7$=H or $C_1$–$C_{10}$-alkyl linear and/or branched II: with $R_1$=OH, $R_4$=$OR_7$, $R_2$, $R_3$ $R_5$, $R_6$, $R_7$=H or $C_1$–$C_{10}$-alkyl linear and/or branched

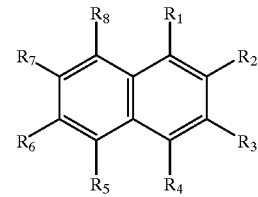

Formula III - VI

III: with $R_1$=OH, $R_2$=$OR_9$, $R_3$, $R_4$, $R_5$, $R_6$, $R_7$, $R_8$, $R_9$=H or $C_1$–$C_{10}$-alkyl linear and/or branched IV: with $R_1$=OH, $R_4$=$OR_9$, $R_2$, $R_3$, $R_5$, $R_6$, $R_7$, $R_8$, $R_9$=H or $C_1$–$C_{10}$-alkyl linear and/or branched V: with $R_1$=OH, $R_8$=$OR_9$, $R_2$, $R_3$, $R_4$, $R_5$, $R_6$, $R_7$, $R_9$=H or $C_1$–$C_{10}$-alkyl linear and/or branched VI: with $R_2$=OH, $R_6$=$OR_9$, $R_2$, $R_3$, $R_4$, $R_5$, $R_7$, $R_8$, $R_9$=H or $C_1$–$C_{10}$-alkyl linear and/or branched

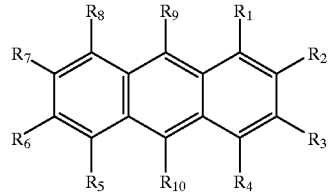

Formula VII - IX

VII: with $R_1$=OH, $R_4$=$OR_{11}$, $R_2$, $R_3$, $R_5$, $R_6$, $R_7$, $R_8$, $R_9$, $R_{10}$, $R_{11}$=H or $C_1$–$C_{10}$-alkyl linear and/or branched VIII: with $R_2$=OH, $R_6$=$OR_{11}$, $R_1$, $R_3$, $R_4$, $R_5$, $R_7$, $R_8$, $R_{10}$, $R_{11}$=H or $C_1$–$C_{10}$-alkyl linear and/or branched IX: with $R_9$=OH, $R_{10}$=$OR_{11}$, $R_1$, $R_2$, $R_3$, $R_4$, $R_5$, $R_6$, $R_7$, $R_8$, $R_{11}$=H or $C_1$–$C_{10}$-alkyl linear and/or branched

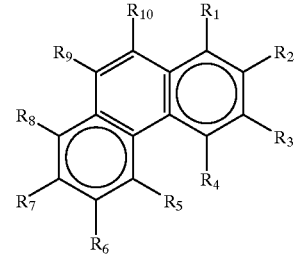

Formula X

X: with $R_9$—OH, $R_{10}$=$OR_{11}$, $R_1$, $R_2$, $R_3$, $R_4$, $R_5$, $R_6$, $R_7$, $R_8$, $R_{11}$=H or $C_1$–$C_{10}$-alkyl linear and/or branched In the context of the compounds I–X, particular preference is given to hydroquinone, toluhydroquinone and mono-tert-butylhydroquinone.

Suitable carboxyl-functional polyesters can be prepared in accordance with the prior art by the condensation processes known for polyesters (esterification and/or transesterification). It is also possible if desired to use suitable catalysts, such as, for example, dibutyltin oxide or titanium tetrabutylate.

As acid components, carboxyl-functional copolyesters include primarily aromatic polybasic carboxylic acids, such as terephthalic acid, isophthalic acid, phthalic acid, pyromellitic acid, trimellitic acid, 3,6-dichlorophthalic acid, tetrachlorophthalic acid and—where available—their anhydride, chloride or esters. In most cases they contain at least 50 mol % of terephthalic acid and/or isophthalic acid, preferably 80 mol %. The remainder of the acids (the difference from 100 mol %) consists of aliphatic and/or cycloaliphatic polybasic acids, such as 1,4-cyclohexanedicarboxylic acid, tetrahydrophthalic acid, hexahydroendomethyleneterephthalic acid, hexachloro-phthalic acid, azelaic acid, sebacic acid, decane-dicarboxylic acid, adipic acid, dodecane-dicarboxylic acid, succinic acid, maleic acid, or dimeric fatty acids. Hydroxycarboxylic acids and/or lactones, such as 12-hydroxystearic acid, epsilon-caprolactone or hydroxypivalic esters of neopentyl glycol, can likewise be used.

Also employed in minor amounts are monocarboxylic acids, such as benzoic acid, tertiary-butylbenzoic acid, hexahydrobenzoic acid and saturated aliphatic monocarboxylic acids.

Suitable alcohol components that may be mentioned are aliphatic diols, such as ethylene glycol, 1,3-propanediol, 1,2-propanediol, 1,2-butanediol, 1,3-butanediol, 1,4-butanediol, 2,2-dimethyl-1,3-propanediol, (neopentyl glycol), 2,5-hexanediol, 1,6-hexanediol, 2,2-[bis(4-hydroxycyclohexyl)]propane, 1,4-dimethylolcyclohexane, diethylene glycol, di-propylene glycol and 2,2-bis[4-(2-hydroxy)]-phenylpropane. Also employed in relatively minor amounts are polyols, such as glycerol, hexanetriol, pentaeryltritol [sic], sorbitol, trimethylolethane, trimethylolpropane and tris(2-hydroxy) isocyanurate [sic].

In addition, epoxy compounds are used instead of diols or polyols. Preferably, the proportion of neopentyl glycol and/or propylene glycol in the alcohol component is at least 50 mol %, based on total acids.

The epoxy resins based on bisphenol A and epichlorohydrin that are used are, for example, diglycidyl ethers of bisphenol A and its higher adducts. Various commercially available epoxy resins are suitable, such as Grilonit-Harze® from EMS-Chemie AG, Epikote-Harze® from Shell, Araldit-Harze® from Ciba and DER-Harze® from Dow Chem. Corp. In general, these resins have an average molecular weight of between 300 and 4000 and an epoxy equivalent weight of between 150 and 2000 (g/eq.).

The equivalents ratio of epoxy equivalents to carboxylic acid equivalents lies within the range of 0.6 to 1.2, preferably from 0.8 to 1.2.

The proportion of the compounds according to the general formulae I–X lies, based on the overall material, between 0.001% by weight and 10% by weight, preferably between 0.01 and 5% by weight.

The invention relates additionally to a process for preparing powder coating materials.

For the preparation of the powder coating materials in this case it is possible to use the customary pigments and/or fillers and/or additives.

These are additives from the group of accelerators, leveling and devolatilizing agents, heat, UV and HALS stabilizers and/or triboadditives and, if required, matting agents, such as waxes, for example.

The preparation of powder coating materials takes place preferably in the melt by conjoint extrusion of all of the formulation constituents at temperatures between 60 and 140C. The extrudate is subsequently cooled, ground and screened to a particle size of less than 90 $\mu$m. Other processes for preparing the powder coating materials are also suitable in principle, such as, for example, mixing the formulation constituents in solution and subsequent precipitation or distillative removal of the solvents.

The application of the powder coating materials of the invention takes place in accordance with the techniques customary for powder coating materials, for example by means of electrostatic spraying equipment (corona or tribo) or by the fluidized-bed technique.

The yellowing resistance test in the laboratory takes place by curing the powder-coated metal panels in an electric oven using a mixture consisting of sodium nitrite and 30% strength acetic acid as the supplier of nitrous gases. Subsequently, the color changes of the powder coating film are determined using an LAB system relative to a powder coating film cured only in the electric oven without nitrous gases.

Comparative Example 291.25 g of Grilesta P 7224 (carboxyl-functional copolyester from UCB (B), having an acid number of about 70 [mg of KOH/g] and a Tg of about 60° C.), 291.25 g of Grilonit L 1203.5 (epoxy resin based on bisphenol A, having an epoxy equivalent weight of about 800 [g/eq.] from EMS-Chemie AG (CH)), 400 g of Kronos Cl 2160 ($TiO_2$ from Kronos (D)), 7 g of Resiflow PV 88 (polyacrylate-based leveling agent, commercial product from Worlee-Chemie GmbH), 7.5 g of Irgafos PEPQ (phos,phite-containing heat stabilizer from Ciba (CH)) and 3 g of benzoin are subjected to dry mixing in a Henschel mixer at 700 rpm for 30 seconds and the mixture is subsequently extruded on a Buss co-kneader (PLK 46) at a barrel temperature of 100° C., with a cooled screw, and at a screw rotary speed of 150 rpm. The extrudate is cooled, ground and screened to less than 90 $\mu$m.

The powder coating materials are applied electrostatically (corona or tribo) to aluminum panels (Q-panel AL-36 5005 H 14/08 (0.8 mm)) and are cured at a baking temperature of 180° C. and a baking time of 30 minutes in electric oven UT 6060 from Haereus [sic], which shortly before the coated aluminum panels are introduced has been charged with a mixture of 0.5 g of sodium nitrite and 1.25 g of a 30% strength acetic acid. As a reference, curing is carried out in the same electric oven under the same baking conditions without nitrous gases and the color change is determined with the Colorpen calorimeter from Dr. Lange (D). The coat thickness is about 60 $\mu$m.

Table 1 shows the yellowing properties.

EXAMPLE 1

288.75 g of Grilesta P 7224 (carboxyl-functional copolyester from UCB (B), having an acid number of about 70 [mg of KOH/g] and a Tg of about 60° C.), 288.75 g of Grilonit L 1203.5 (epoxy resin based on bisphenol A, having an epoxy equivalent weight of about 800 [g/eq.] from EMS-Chemie AG (CH)), 5.0 g of mono-tert-butylhydroquinone, 400 g of Kronos Cl 2160 ($TiO_2$ from Kronos (D)), 7 g of Resiflow PV 88 (polyacrylate-based leveling agent, commercial product from Worlee-Chemie GmbH), 7.5 g of Irgafos PEPQ (phosphite-containing heat stabilizer from Ciba (CH)) and 3 g of benzoin are processed to form powder coating material and tested in analogy to the comparative example.

TABLE 1

|  | Berger whiteness/ electric oven | Berger whiteness/ electric oven and nitrous gases | Color difference delta E electric oven and nitrous gases/ electric oven |
|---|---|---|---|
| Comparative example | 85 | 64 | 4.0 |
| Example 1 | 85 | 78 | 1.6 |

What is claimed is:

1. Heat-curing coating material consisting of (A) a carboxyl-functional polyester prepared by a condensation reaction of aliphatic and/or cycloaliphatic polyols with aliphatic and/or cycloaliphatic and/or aromatic polycarboxylic acid and anhydrides, where the polyester has a Tg in the range from 30° C. to 80° C. and an acid number of from about 20 to 100 [mg of KOH/g], and (B) an epoxy resin based on bisphenol A and epichlorohydrin, where the equivalents ratio of epoxy equivalents to carboxylic acid equivalents lies within the range from 0.6 to 1.2, and (C) at least one compound of the following general formulae (I)–(X)

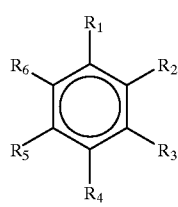

Formula I + II

I: with $R_1$=OH, $R_2$=$OR_7$, $R_3$, $R_4$, $R_5$, $R_6$, $R_7$=H or $C_1$–$C_{10}$-alkyl linear and/or branched II: with $R_1$=OH, $R_4$=$OR_7$, $R_2$, $R_3$, $R_5$, $R_6$, $R_7$=H or $C_1$–$C_{10}$-alkyl linear and/or branched

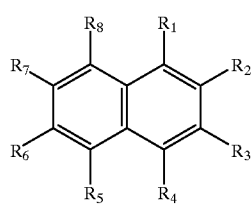

Formula III - VI

III: with $R_1$=OH, $R_2$=$OR_9$, $R_3$, $R_4$, $R_5$, $R_6$, $R_7$, $R_8$, $R_9$=H or $C_1$–$C_{10}$-alkyl linear and/or branched IV: with $R_1$=OH, $R_4$=$OR_9$, $R_2$, $R_3$, $R_5$, $R_6$, $R_7$, $R_8$, $R_9$=H or $C_1$–$C_{10}$-alkyl linear and/or branched V: with $R_1$=OH, $R_8$=$OR_9$, $R_2$, $R_3$, $R_4$, $R_5$, $R_6$, $R_7$, $R_9$=H or $C_1$–$C_{10}$-alkyl linear and/or branched VI: with $R_2$=OH, $R_6$=$OR_9$, $R_2$, $R_3$, $R_4$, $R_5$, $R_7$, $R_8$, $R_9$=H or $C_1$–$C_{10}$-alkyl linear and/or branched

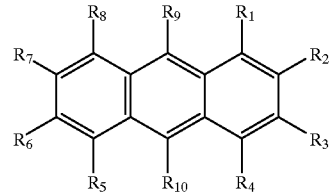

Formula VII - IX

VII: with $R_1$=OH, $R_4$=$OR_{11}$, $R_2$, $R_3$, $R_5$, $R_6$, $R_7$, $R_8$, $R_9$, $R_{10}$, $R_{11}$=H or $C_1$–$C_{10}$-alkyl linear and/or branched VIII: with $R_2$=OH, $R_6$=$OR_{11}$, $R_1$, $R_3$, $R_4$, $R_5$, $R_7$, $R_8$, $R_{10}$, $R_{11}$=H or $C_1$–$C_{10}$-alkyl linear and/or branched IX: with $R_9$=OH, $R_{10}$=$OR_{11}$, $R_1$, $R_2$, $R_3$, $R_4$, $R_5$, $R_6$, $R_7$, $R_8$, $R_{11}$=H or $C_1$–$C_{10}$-alkyl linear and/or branched

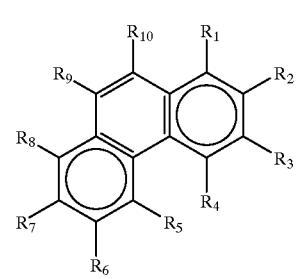

Formula X

X: with $R_9$=OH, $R_{10}$=$OR_{11}$, $R_1$, $R_2$, $R_3$, $R_4$, $R_5$, $R_6$, $R_7$, $R_8$, $R_{11}$=H or $C_1$–$C_{10}$-alkyl linear and/or branched and, if desired, pigments and/or fillers and/or heat stabilizers, preferably phosphites and/or triboadditives and/or further additives, such as, for example, leveling agents and devolatilizing agents.

2. Heat-curable coating materials according to claim 1, characterized in that the proportion of the compounds (I) to (X), based on the overall material, is between 0.001% by weight and 10% by weight, preferably between 0.01 and 5% by weight.

3. Heat-curable coating materials according to claim 1, characterized in that among the compounds (I) to (X) preference is given to hydroquinone, toluhydroquinone, trimethylhydroquinone and mono-tert-butylhydroquinone.

4. Heat-curable coating materials according to claim 1, characterized in that the epoxy resin based on bisphenol A and epichlorohydrin is a relatively high adduct of the diglycidyl ether of bisphenol A, having an average molecular weight of between 300 and 4000 and an epoxy equivalent weight of between 150 and 2000 [g/eq.].

5. Process for preparing powder coating materials, with carboxyl-functional polyester and an epoxy resin based on bisphenol A and epichlorohydrin, characterized in that all of the formulation constituents of the coating materials according to claim 1, and, in addition, customary pigments and/or fillers and/or additives are subjected to conjoint extrusion in the melt at temperatures between 60 and 140° C. to prepare an extrudate, which is subsequently cooled, ground and screened to a particle size of <90 μm.

6. A heat-curing coating material comprising:

(A) a carboxyl-functional polyester prepared by a condensation reaction of aliphatic and/or cycloaliphatic polyols with aliphatic and/or cycloaliphatic and/or aromatic polycarboxylic acid and anhydrides, where the polyester has a Tg in the range from 30° C. to 80° C. and an acid number of from about 20 to 100 [mg of KOH/g], and (B) an epoxy resin based on bisphenol A and epichlorohydrin, where the equivalents ratio of epoxy equivalents to carboxylic acid equivalents lies within the range from 0.6 to 1.2, and (C) at least one compound of the following general formulae (I)–(X)

Formula I + II

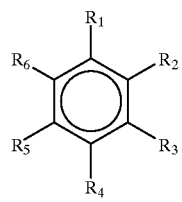

I: with $R_1$=OH, $R_2$=$OR_7$, $R_3$, $R_4$, $R_5$, $R_6$, $R_7$=H or $C_1$–$C_{10}$-alkyl linear and/or branched II: with $R_1$=OH, $R_4$=$OR_7$, $R_2$, $R_3$, $R_5$, $R_6$, $R_7$=H or $C_1$–$C_{10}$-alkyl linear and/or branched Formula III - VI

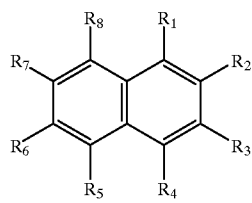

III: with $R_1$=OH, $R_2$=$OR_9$, $R_3$, $R_4$, $R_5$, $R_6$, $R_7$, $R_8$, $R_9$=H or $C_1$–$C_{10}$-alkyl inear and/or branched IV: with $R_1$=OH, $R_4$=$OR_9$, $R_2$, $R_3$, $R_5$, $R_6$, $R_7$, $R_8$, $R_9$=H or $C_1$–$C_{10}$-alkyl linear and/or branched V: with $R_1$=OH, $R_8$=$OR_9$, $R_2$, $R_3$, $R_4$, $R_5$, $R_6$, $R_7$, $R_9$=H or $C_1$–$C_{10}$-alkyl linear and/or branched VI: with $R_2$=OH, $R_6$=$OR_9$, $R_2$, $R_3$, $R_4$, $R_5$, $R_7$, $R_8$, $R_9$=H or $C_1$–$C_{10}$-alkyl linear and/or branched Formula VII - IX

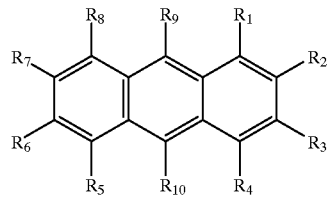

VII: with $R_1$=OH, $R_4$=$OR_{11}$, $R_2$, $R_3$, $R_5$, $R_6$, $R_7$, $R_8$, $R_9$, $R_{10}$, $R_{11}$=H or $C_1$–$C_{10}$-alkyl linear and/or branched VIII: with $R_2$=OH, $R_6$=$OR_{11}$, $R_1$, $R_3$, $R_4$, $R_5$, $R_7$, $R_8$, $R_{10}$, $R_{11}$=H or $C_1$–$C_{10}$-alkyl linear and/or branched IX: with $R_9$=OH, $R_{10}$=$OR_{11}$, $R_1$, $R_2$, $R_3$, $R_4$, $R_5$, $R_6$, $R_7$, $R_8$, $R_{11}$=H or $C_1$–$C_{10}$-alkyl linear and/or branched Formula X

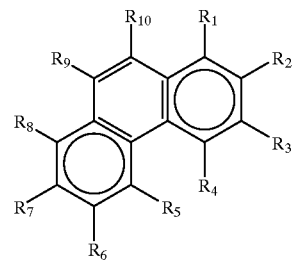

X: with $R_9$=OH, $R_{10}$=$OR_{11}$, $R_1$, $R_2$, $R_3$, $R_4$, $R_5$, $R_6$, $R_7$, $R_8$, $R_{11}$=H or $C_1$–$C_{10}$-alkyl linear and/or branched.

7. A protective coating comprising the heat-curable coating materials according to claim 1.

* * * * *